US008676209B2

(12) United States Patent
Gorokhov et al.

(10) Patent No.: US 8,676,209 B2
(45) Date of Patent: Mar. 18, 2014

(54) HANDOFF SELECTION FOR WIRELESS COMMUNICATION SYSTEMS

(75) Inventors: Alexei Gorokhov, San Diego, CA (US); Aamod Khandekar, San Diego, CA (US); Tamer Kadous, San Diego, CA (US); Mohammad J. Borran, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1724 days.

(21) Appl. No.: 11/761,790

(22) Filed: Jun. 12, 2007

(65) Prior Publication Data
US 2007/0287462 A1 Dec. 13, 2007

Related U.S. Application Data

(60) Provisional application No. 60/813,483, filed on Jun. 13, 2006.

(51) Int. Cl.
*H04W 36/00* (2009.01)
*H04W 4/00* (2009.01)

(52) U.S. Cl.
USPC ........... 455/439; 455/436; 455/437; 370/331; 370/332

(58) Field of Classification Search
CPC . H04L 27/2613; H04L 5/0023; H04L 5/0048; H04W 36/20; H04W 36/36
USPC .......... 370/331, 430, 208, 332; 455/439, 436, 455/437
See application file for complete search history.

(56) References Cited

U.S. PATENT DOCUMENTS

| 5,781,543 A | 7/1998 | Ault et al. |
| 6,097,714 A | 8/2000 | Nagatani et al. |

(Continued)

FOREIGN PATENT DOCUMENTS

| CL | 22312004 | 6/2005 |
| CL | 14732005 | 1/2006 |

(Continued)

OTHER PUBLICATIONS

ETSI ETS 300 744; "Digital Video Broadcasting (DVB); Framing structure, channel coding and modulation for digital Terrestrial television (DVB-T)" Mar. 1997, pp. 25-34.

(Continued)

*Primary Examiner* — Opiribo Georgewill
(74) *Attorney, Agent, or Firm* — Darren M. Simon

(57) ABSTRACT

Techniques for selecting serving sectors and performing handoff for a terminal on the forward and reverse links are described. The terminal may obtain pilot measurements for pilots transmitted on the forward link and may update an active set based on the pilot measurements. The terminal may send a transmission (e.g., for pilot, signaling, etc.) on the reverse link and may receive channel quality information indicative of reverse link channel quality for the terminal at multiple sectors in the active set. The transmission may include pilot, and the channel quality information from each sector may include a pilot carrier-over-thermal ratio (pCoT) determined by that sector based on the pilot. The terminal may select a serving sector based on the channel quality information, interference information, and/or other information and may send a request for handoff (e.g., via a signaling message an/or an access probe) to the selected serving sector.

28 Claims, 9 Drawing Sheets

(56) References Cited

U.S. PATENT DOCUMENTS

| | | | |
|---|---|---|---|
| 6,137,847 | A | 10/2000 | Stott et al. |
| 6,289,007 | B1 | 9/2001 | Kim et al. |
| 6,370,134 | B1 | 4/2002 | Aramaki |
| 6,414,986 | B1 | 7/2002 | Usui |
| 6,430,200 | B1 | 8/2002 | Han et al. |
| 6,449,481 | B1 | 9/2002 | Kwon et al. |
| 6,483,829 | B1 | 11/2002 | Yamamoto |
| 6,556,551 | B1 | 4/2003 | Schwartz |
| 6,574,205 | B1 | 6/2003 | Sato |
| 6,795,489 | B2 | 9/2004 | Joshi et al. |
| 6,888,805 | B2 | 5/2005 | Bender et al. |
| 6,929,539 | B2 | 8/2005 | Schutz et al. |
| 6,940,827 | B2 | 9/2005 | Li et al. |
| 7,051,725 | B2 | 5/2006 | Ikemoto et al. |
| 7,120,133 | B1 | 10/2006 | Joo et al. |
| 7,197,692 | B2 | 3/2007 | Sutivong et al. |
| 7,280,467 | B2 | 10/2007 | Smee et al. |
| 7,583,584 | B2 | 9/2009 | Wang et al. |
| 7,751,374 | B2 | 7/2010 | Donovan |
| 7,756,211 | B2 | 7/2010 | Kim et al. |
| 2002/0110138 | A1* | 8/2002 | Schramm ............... 370/430 |
| 2002/0154610 | A1* | 10/2002 | Tiedemann et al. ..... 370/329 |
| 2002/0193104 | A1* | 12/2002 | Scherzer et al. ........ 455/423 |
| 2002/0196752 | A1* | 12/2002 | Attar et al. ............ 370/331 |
| 2003/0035405 | A1 | 2/2003 | Nagatani et al. |
| 2004/0058081 | A1 | 3/2004 | Potyrailo et al. |
| 2004/0233870 | A1* | 11/2004 | Willenegger et al. .... 370/329 |
| 2005/0018631 | A1 | 1/2005 | Sivakumar et al. |
| 2005/0063298 | A1 | 3/2005 | Ling et al. |
| 2005/0147025 | A1 | 7/2005 | Auer |
| 2005/0163262 | A1 | 7/2005 | Gupta |
| 2005/0201368 | A1 | 9/2005 | Periyalwar et al. |
| 2005/0281242 | A1 | 12/2005 | Sutivong et al. |
| 2005/0281290 | A1 | 12/2005 | Khandekar et al. |
| 2006/0019694 | A1 | 1/2006 | Sutivong et al. |
| 2006/0028976 | A1 | 2/2006 | Park et al. |
| 2006/0135162 | A1* | 6/2006 | Julian et al. ............ 455/436 |
| 2006/0140313 | A1* | 6/2006 | Futami et al. ............ 375/343 |
| 2006/0183481 | A1 | 8/2006 | Furukawa et al. |
| 2006/0209752 | A1 | 9/2006 | Wijngaarden et al. |
| 2006/0209927 | A1 | 9/2006 | Khandekar et al. |
| 2007/0173276 | A1* | 7/2007 | Love et al. ............ 455/522 |
| 2007/0207812 | A1 | 9/2007 | Borran et al. |
| 2008/0123616 | A1 | 5/2008 | Lee |
| 2008/0279220 | A1 | 11/2008 | Wang |
| 2008/0285526 | A1 | 11/2008 | Gorokhov et al. |

FOREIGN PATENT DOCUMENTS

| | | |
|---|---|---|
| CL | 14742005 | 1/2006 |
| CL | 14762005 | 1/2006 |
| CN | 1348636 A | 5/2002 |
| JP | 10190625 | 7/1998 |
| JP | H10509287 A | 9/1998 |
| JP | 11088295 A | 3/1999 |
| KR | 1020000067168 | 11/2000 |
| RU | 2145152 C1 | 1/2000 |
| RU | 2149509 | 5/2000 |
| RU | 2157592 | 10/2000 |
| RU | 2178239 C2 | 1/2002 |
| RU | 2395170 | 7/2010 |
| TW | 200610292 | 3/2006 |
| WO | 9608908 A2 | 3/1996 |
| WO | WO9925080 | 5/1999 |
| WO | WO0065736 | 11/2000 |
| WO | WO2005022797 | 3/2005 |
| WO | 2005074222 | 8/2005 |
| WO | WO2005107121 A1 | 11/2005 |
| WO | WO2006000091 | 1/2006 |
| WO | WO2006009711 | 1/2006 |
| WO | 2007137276 | 11/2007 |
| WO | 2008042889 A1 | 4/2008 |

OTHER PUBLICATIONS

Kwang, Soon Kim et al.: "A Preamble-Based Cell Searching Technique for OFDM Cellular Systems." Vehicular Technology Conference, 2003, vol. 4, pp. 2471-2475.

Pace, et al., "System Level Performance Evaluation of UTRA-FDD (UMTS Terrestrial Radio Access—Frequency Division Duplex)," 11th IEEE International Symposium on Personal, Indoor and Mobile Radio Communications, PIMRC 2000, Sep. 18-21, 2000, pp. 343-347, vol. 1.

UMTS Terrestrial Radio Access Concept Evaluation ETSI Technical Report, Dec. 1997, pp. 47-48, XP002109765.

Yeh, et al.; "OFDM System Channel Estimation Using Time-Domain Training Sequence for Mobile Reception of Digital Terrestrial Broadcasting," IEEE Transactions on Broadcasting, vol. 46, Issue 3, Sep. 2000 pp. 215-220.

Higuchi K., et al., "Fast Cell Search Algorithm using Long Code Masking in DS-CDMA Asynchronous Cellular System," Technical Report of the Institute of Electronics, Information and Communication Engineers, Jan. 23, 1997, vol. 96, No. 477, pp. 57-63, RCS 96-122.

Huawei et al., "CoMP clarification of definitions and TP", R1-083906, 3rd Generation Partnership Project (3GPP), Mobile Competence Centre; 650, Route Des Lucioles; F-06921 Sophia-Antipolis Cedex; France, No. Prague, Czech Republic, Oct. 6, 2008, XP050317217, [retrieved on Oct. 6, 2008].

Taiwan Search Report—TW096125068—TIPO—Jun. 23, 2011.

Bhushan N., "QUALCOMM Proposal for 3GPP2 Air Interface Evolution Phase 2, Rev.2", 3GPP2 Contribution, Mar. 27, 2006,C30-20060327-023R2.

Tomcik J., "MBFDD and MBTDD Wideband Mode: Technology Overview", IEEE 802.20 Working Group on Mobile Broadband Wireless Access, pp. 1-109, Jan. 6, 2006, IEEE C802.20-05/68r1.

\* cited by examiner

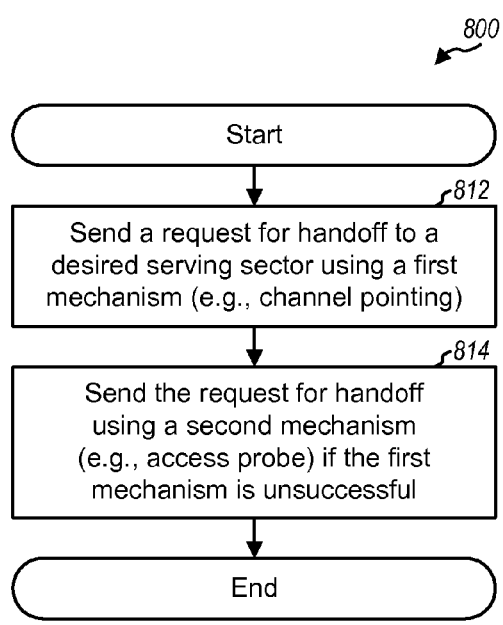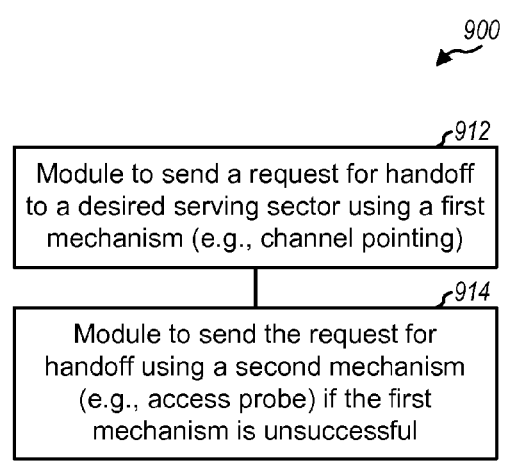
FIG. 8
FIG. 9

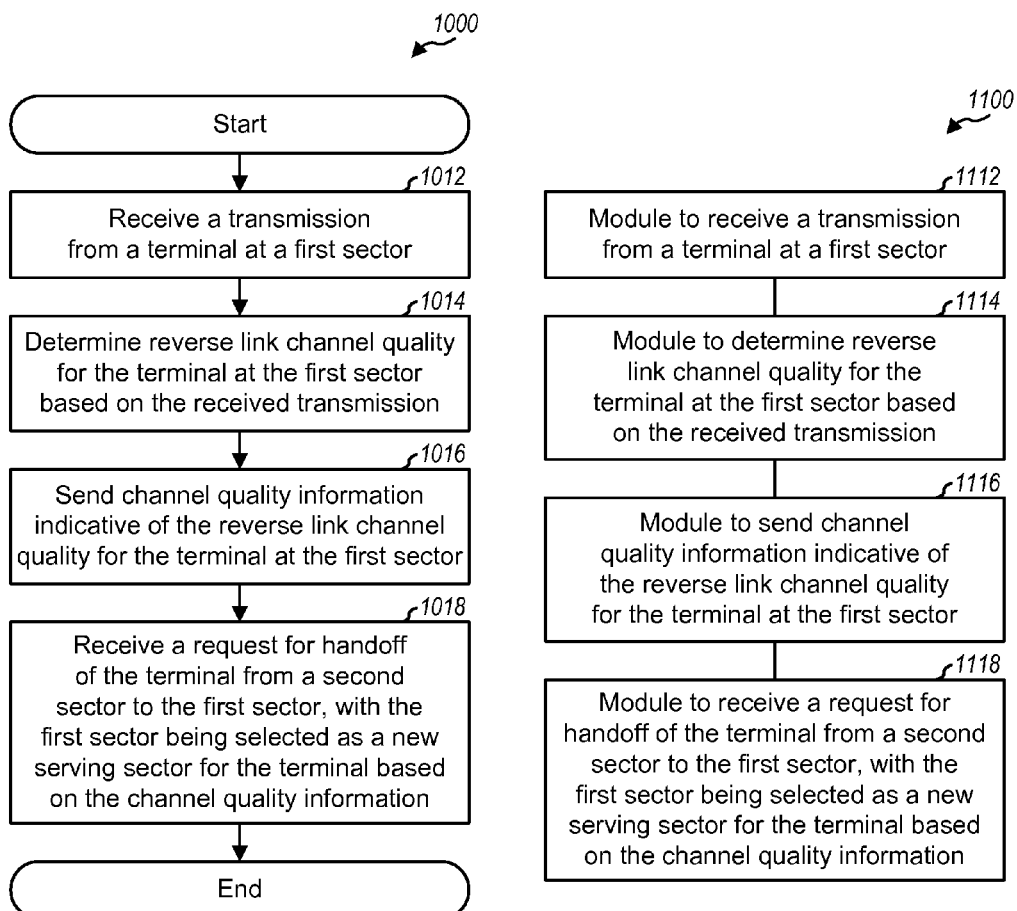

HANDOFF SELECTION FOR WIRELESS COMMUNICATION SYSTEMS

The present application claims priority to provisional U.S. Application Ser. No. 60/813,483, entitled "HANDOFF SELECTION FOR WIRELESS COMMUNICATION SYSTEMS," filed Jun. 13, 2006, assigned to the assignee hereof and incorporated herein by reference.

BACKGROUND

I. Field

The present disclosure relates generally to communication, and more specifically to techniques for performing handoff in a wireless communication system.

II. Background

Wireless communication systems are widely deployed to provide various communication services such as voice, video, packet data, messaging, broadcast, etc. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless multiple-access communication system may include many sectors, where the term "sector" can refer to a base station and/or its coverage area, depending on the context in which the term is used. The sectors can support communication for terminals on the forward and reverse links. The forward link (or downlink) refers to the communication link from the base stations to the terminals, and the reverse link (or uplink) refers to the communication link from the terminals to the base stations. On the forward link, a terminal may observe different channel conditions for different sectors and may thus receive transmissions from these sectors with different received signal qualities. On the reverse link, different sectors may observe different channel conditions for the terminal and may thus receive a transmission from the terminal with different received signal qualities. Improved performance and better resource utilization may be achieved by selecting appropriate sectors to serve the terminal on the forward and reverse links.

There is therefore a need in the art for techniques to select serving sectors for a terminal in a wireless communication system.

SUMMARY

Techniques for selecting serving sectors and performing handoff for a terminal on the forward and reverse links are described herein. In one design, the terminal may obtain pilot measurements for pilots transmitted on the forward link and may update an active set based on the pilot measurements. The active set may include sectors that can serve the terminal on the forward and/or reverse link. The terminal may send a transmission (e.g., for pilot, signaling, etc.) on the reverse link. The terminal may receive channel quality information indicative of reverse link channel quality for the terminal at multiple sectors in the active set. The channel quality information may be determined by the sectors based on the transmission sent by the terminal on the reverse link. For example, the transmission may comprise pilot, and the channel quality information from each sector may comprise a pilot carrier-over-thermal ratio (pCoT) determined by that sector based on the pilot. A serving sector for the terminal may be selected based on the channel quality information, interference information, and/or other information. The terminal may send a request for handoff (e.g., via a signaling message and/or an access probe) to the selected serving sector if it is not the current serving sector.

Various aspects and features of the disclosure are described in further detail below.

BRIEF DESCRIPTION OF THE DRAWINGS

FIG. 8 shows a process for sending a request for handoff.
FIG. 9 shows an apparatus for sending a request for handoff.
FIG. 10 shows a process for supporting handoff by a sector.
FIG. 11 shows an apparatus for supporting handoff by a sector.

DETAILED DESCRIPTION

The techniques described herein may be used for various wireless communication systems such as CDMA, TDMA, FDMA, OFDMA, and SC-FDMA systems. A CDMA system utilizes code division multiplexing (CDM), and transmissions are sent with different orthogonal codes, pseudo-random sequences, etc. A TDMA system utilizes time division multiplexing (TDM), and transmissions are sent in different time slots. An FDMA system utilizes frequency division multiplexing (FDM), and transmissions are sent on different subcarriers. An OFDMA system utilizes orthogonal frequency division multiplexing (OFDM), and an SC-FDMA system utilizes single-carrier frequency division multiplexing (SC-FDM). OFDM and SC-FDM partition the system bandwidth into multiple orthogonal subcarriers, which are also referred to as tones, bins, etc. Each subcarrier may be modulated with data. In general, modulation symbols are sent in the frequency domain with OFDM and in the time domain with SC-FDM. The techniques may also be used for wireless communication systems utilizing a combination of multiplexing schemes, e.g., CDMA and OFDMA, OFDMA and SC-FDMA, etc. Certain aspects of the techniques are described below for a system that utilizes OFDMA on the forward link and CDMA and OFDMA on the reverse link.

Figure 1:
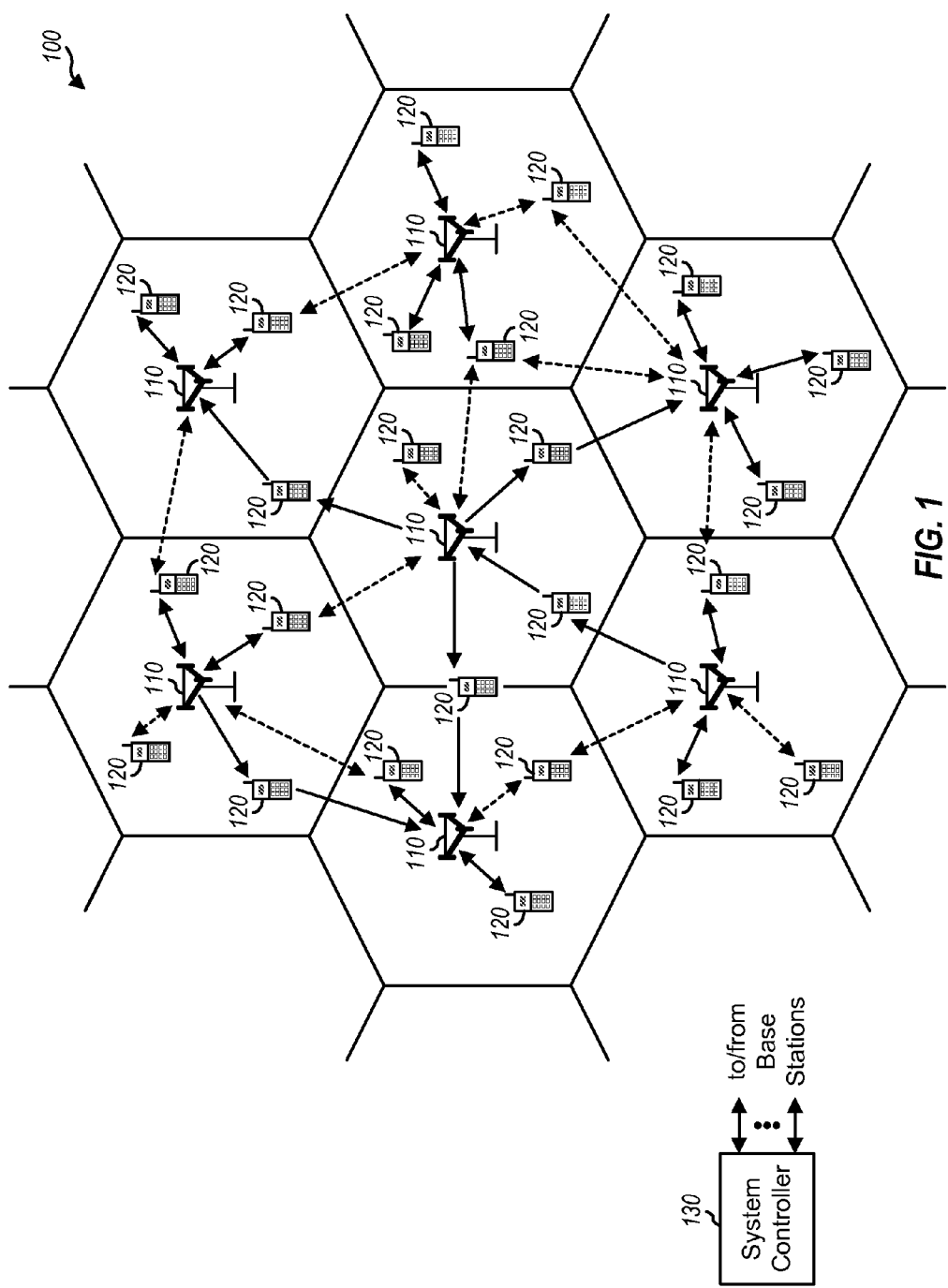
FIG. 1 shows a wireless communication system.

FIG. 1 shows a wireless communication system 100 that includes base stations 110 supporting communication for terminals 120. A base station is a station that communicates with the terminals. A base station may also be called, and may contain some or all of the functionality of, an access point, a Node B, an evolved Node B, etc. Each base station provides communication coverage for a particular geographic area. To improve system capacity, a base station coverage area may be partitioned into multiple (e.g., three) smaller areas. Each smaller area may be served by a respective base transceiver station (BTS). The BTSs for the multiple smaller areas are typically co-located within the base station.

For a centralized architecture, a system controller 130 may couple to the base stations and provide coordination and control for these base stations. System controller 130 may be a single network entity or a collection of network entities. For a distributed architecture, the base stations may communicate with one another as needed.

Terminals 120 may be dispersed throughout the system, and each terminal may be stationary or mobile. A terminal may also be called, and may contain some or all of the functionality of, an access terminal, a mobile station, a user equipment, a subscriber unit, a station, etc. A terminal may be a cellular phone, a personal digital assistant (PDA), a wireless device, a wireless modem, a handheld device, a laptop computer, etc. A terminal may communicate with zero, one, or multiple base stations on the forward and/or reverse link at any given moment. In FIG. 1, a solid line with an arrow at one end indicates data transmission on either the forward or reverse link. A solid line with arrows at both ends indicates data transmission on both the forward and reverse links. A dashed line with arrows at both ends indicates pilot and signaling transmissions on both the forward and reverse links.

The techniques described herein may be used for systems with partitioned base station coverage areas (or sectorized cells) as well as systems with unpartitioned base station coverage areas (or unsectorized cells). In the following description, the term "sector" can refer to the smallest coverage area in the system and/or the base station responsible for this coverage area. The terms "base station" and "sector" are used interchangeably herein.

Figure 2:
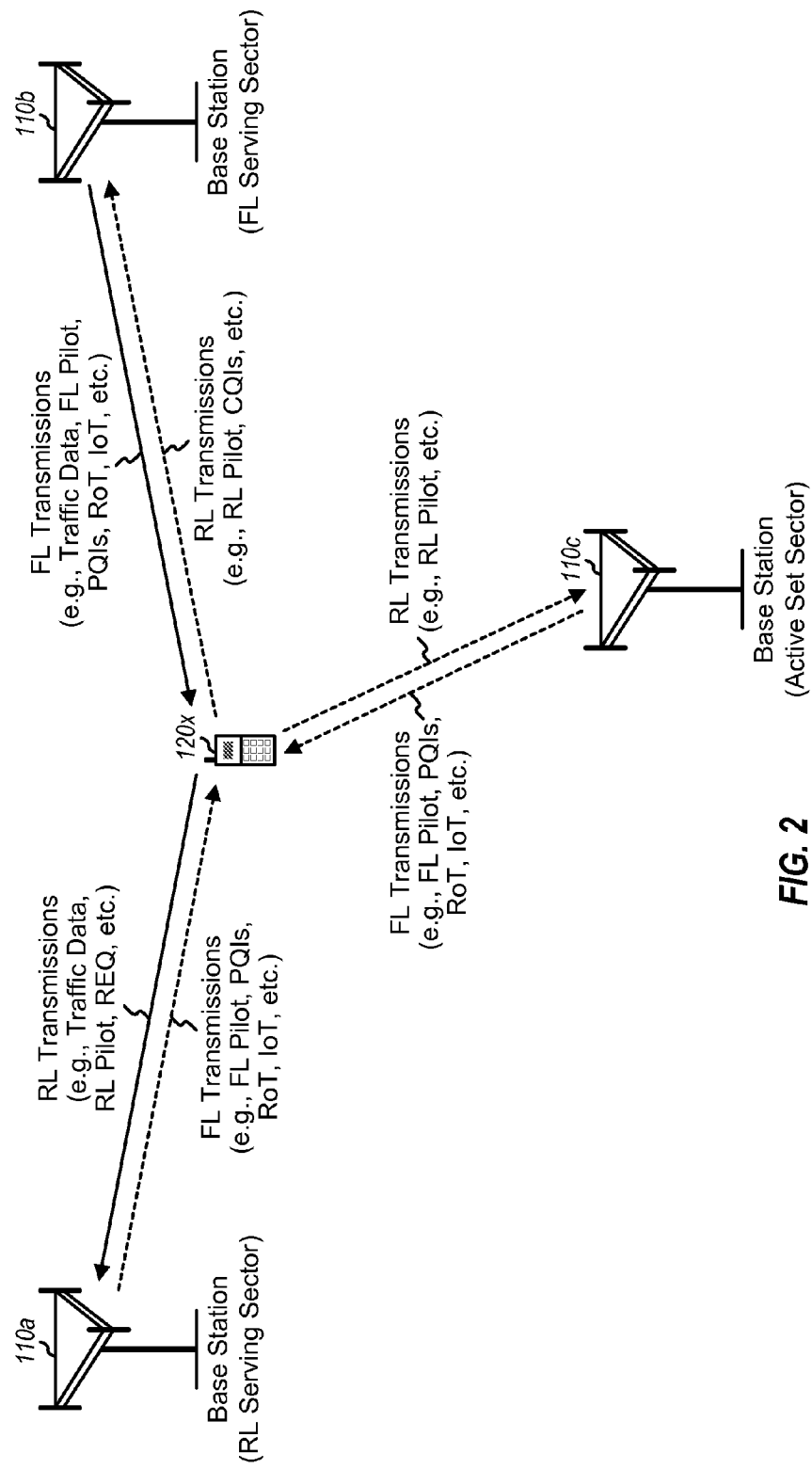
FIG. 2 shows a terminal communicating with three sectors.

FIG. 2 shows an example of a terminal 120x communicating with three sectors 110a, 110b, and 110c. In this example, sector 110a is a reverse link (RL) serving sector for terminal 120x, sector 110b is a forward link (FL) serving sector for terminal 120x, and sector 110c is another sector with which terminal 120x may communicate. A serving sector for a given link is a sector designated to send data to or receive data from terminal 120x on that link. RL serving sector 110a is designated to serve terminal 120x on the reverse link, and FL serving sector 110b is designated to serve terminal 120x on the forward link. Terminal 120x may send RL transmissions to sectors 110a, 110b, and 110c and may receive FL transmissions from these sectors. The various types of transmission in FIG. 2 are described below.

Figure 3:
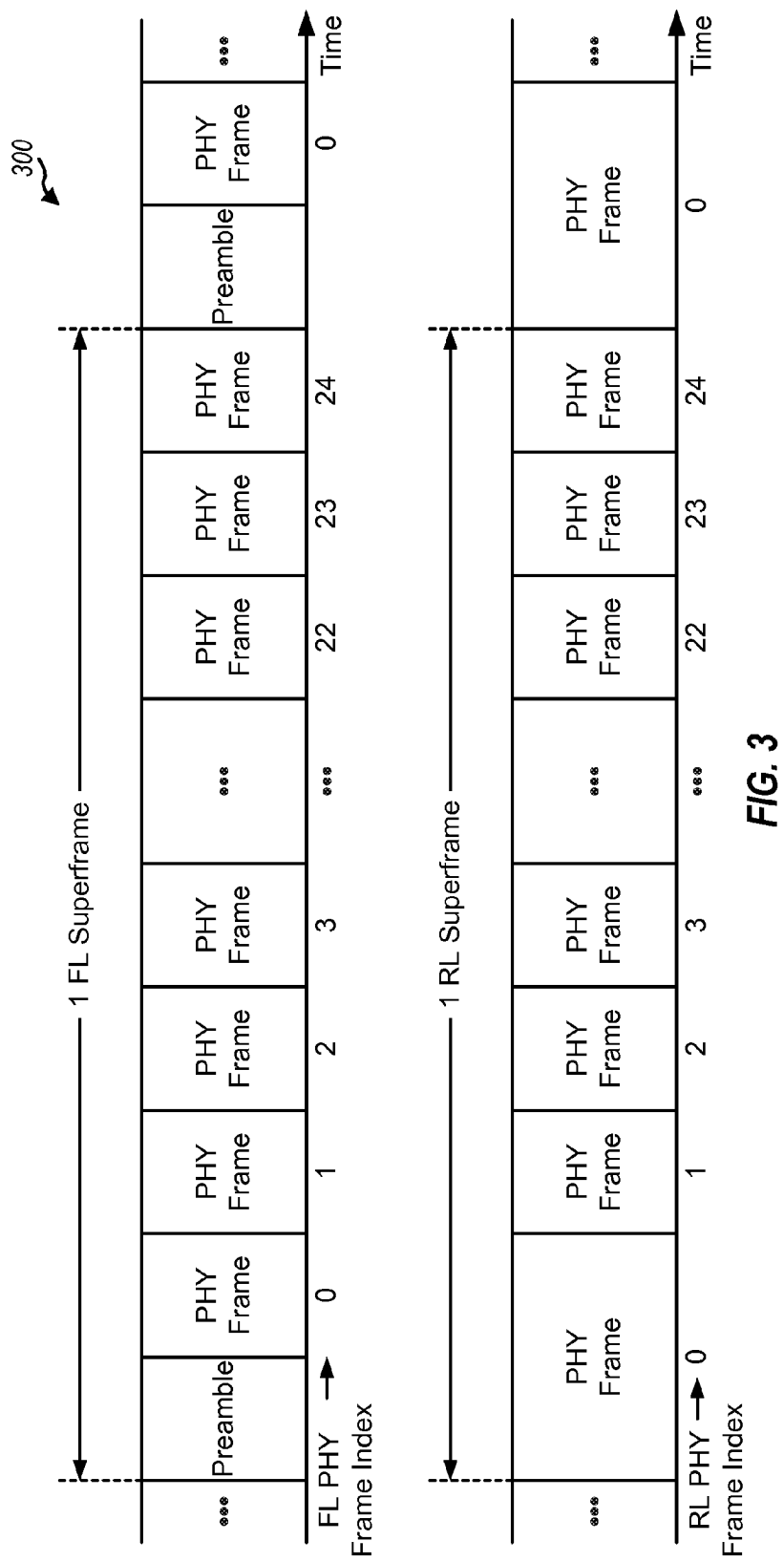
FIG. 3 shows a superframe structure.

FIG. 3 shows an example superframe structure 300 that may be used for the forward and reverse links. The transmission timeline for each link may be partitioned into units of superframes. Each superframe may span a particular time duration, which may be fixed or configurable. For the forward link, each superframe may include a preamble followed by F frames, where in general F>1 and in one design F=25. A frame may also be referred to as a physical layer (PHY) frame, a time slot, etc. The preamble may carry overhead information used by the terminals to receive FL control channels and access the system. Each subsequent frame may carry traffic data and/or signaling. For the reverse link, each superframe may include F frames, where the first frame may be extended by the length of the preamble on the forward link. The superframes on the reverse link may be time aligned with the superframes on the forward link.

Figure 4:
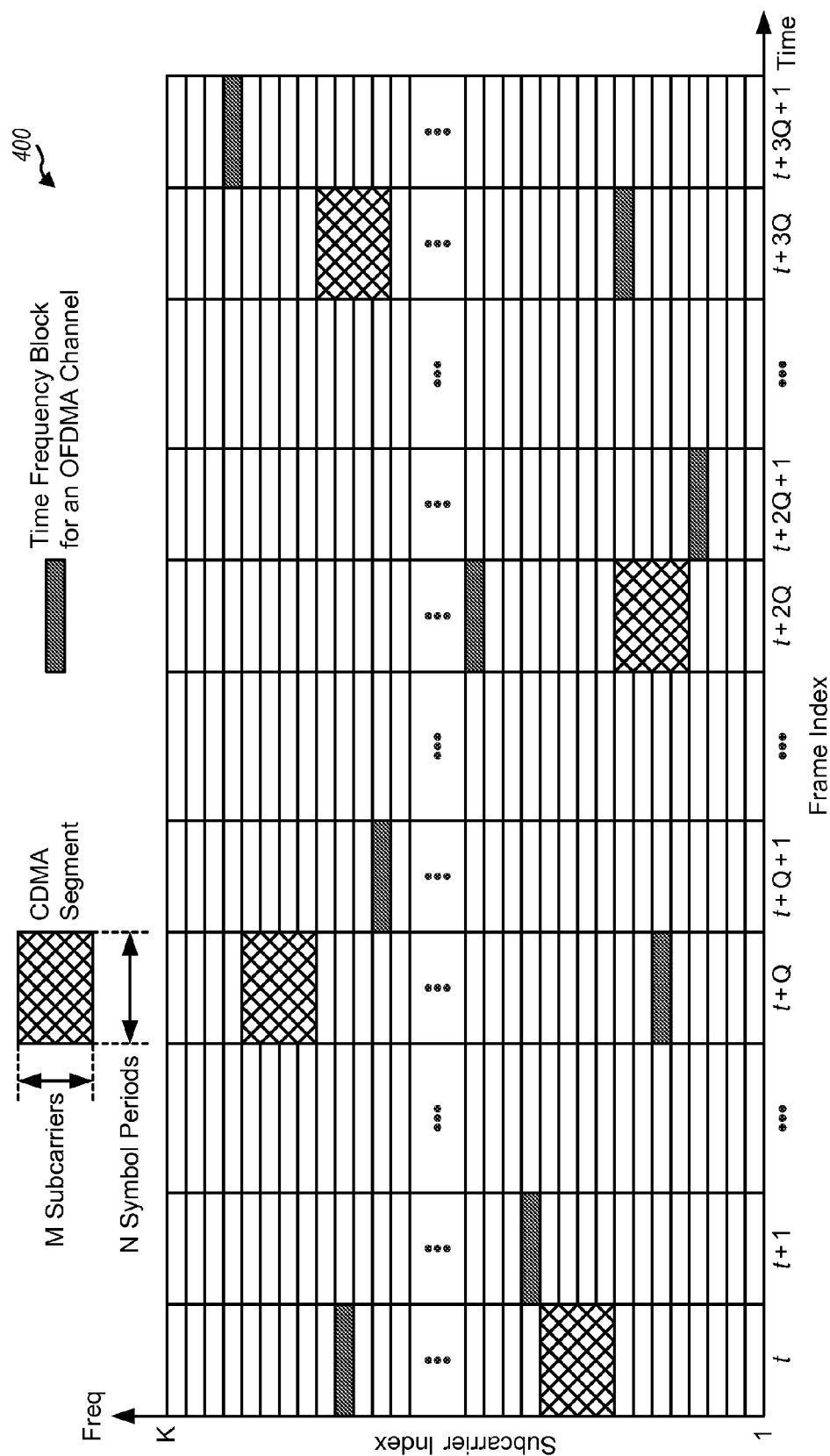
FIG. 4 shows a frame and subcarrier structure.

FIG. 4 shows a frame and subcarrier structure 400 that may be used for the reverse link. The system bandwidth may be partitioned into multiple (K) orthogonal subcarriers that may be assigned indices of 1 through K. All or a subset of the K total subcarriers may be used for transmission. A CDMA segment may support transmission of pilot and signaling on the reverse link. The CDMA segment may occupy a time frequency block of a fixed or configurable dimension and may be sent in every Q frames, where Q>1. The CDMA segment may hop across frequency over time to achieve diversity, as shown in FIG. 4. Traffic data may be sent on time frequency resources not used for the CDMA segment or reserved for other purposes.

Various channels may be defined to carry traffic data, pilot, and signaling on the forward and reverse links. Table 1 shows a set of channels in accordance with one design. The first column of Table 1 lists the different channels, with prefix "F" indicating a channel sent on the forward link and prefix "R" indicating a channel sent on the reverse link. The second column gives a short description of each channel.

TABLE 1

| Channel | Description |
| --- | --- |
| F-PQICH | Channel carrying pilot quality indicator (PQI) indicative of reverse link channel quality. |
| R-PICH | Pilot channel for the reverse link. |
| R-CQICH | Channel carrying channel quality indicator (CQI) indicative of forward link channel quality. |
| R-ACKCH | Channel carrying acknowledgements (ACKs) for data packets received on the forward link. |
| R-REQCH | Channel carrying requests for radio resources on the reverse link. |
| R-ACH | Channel carrying access probes for system access and handoff request. |

In one design, the R-PICH, R-CQICH, R-REQCH, and R-ACH are sent on the CDMA segment and are referred to as CDMA channels. The R-ACKCH is sent using OFDMA. In one design, a message (e.g., a CQI value) may be sent on a CDMA channel by encoding the message to obtain a coded message (e.g., a Walsh sequence). The coded message may be multiplied with a channelization sequence for the CDMA channel and further scaled by a gain to obtain an output sequence. The gain may be determined based on the transmit power for the CDMA channel. The output sequence may be scrambled with a scrambling sequence, which may be generated based on an index of a frame in which the CDMA channel is sent, a Medium Access Control Identifier (MAC ID) for a terminal sending the message, a Sector ID for a target sector to which the message is sent, etc. The scrambled sequence may be further processed and sent in the CDMA segment.

Terminal 120x may receive FL pilots transmitted by different sectors on the forward link and may make measurements for the received FL pilots. The FL pilot measurements may be indicative of the FL channel quality for the sectors and may be used to select serving sectors for the forward and reverse links, as described below. Terminal 120x may also transmit RL pilot on the reverse link to allow the sectors to determine the RL channel quality for terminal 120x.

An active set may be maintained for terminal 120x, e.g., by the terminal or the system. The active set may include sectors that have assigned MAC IDs and control resources for the forward and reverse links to terminal 120x. Terminal 120x may communicate with each sector in the active set using the MAC ID assigned to terminal 120x by that sector. The MAC ID may uniquely identify terminal 120x to the sector. Terminal 120x may also exchange (e.g., send and/or receive) signaling with the sectors in the active set via the assigned control resources.

For active set management, terminal 120x may make FL pilot measurements for FL pilots received from the sectors in the active set, FL pilots received from neighbor sectors conveyed by the system, and FL pilots received from sectors found by terminal 120x during pilot searches. An FL pilot measurement may be for received pilot strength, received pilot quality, etc. Received pilot strength may be the received power of the FL pilot at terminal 120x. Received pilot quality may be quantified by a signal-to-noise-and-interference ratio (SINR) or some other measure of FL pilot quality at terminal 120x. An FL pilot measurement may be made based on an acquisition pilot sent in the preamble of each superframe, a common pilot transmitted periodically on a common pilot channel (CPICH) across the system bandwidth (e.g., on every S subcarriers and in every T symbol periods, where S≥1 and T≥1), or some other type of pilot transmitted on the forward link. Terminal 120x may filter measured values in order to attenuate measurement noise and fast fading components and obtain more accurate FL pilot measurements.

In one design, terminal 120x may select sectors to add to or remove from the active set. Terminal 120x may compare an FL pilot measurement for a new sector that is not in the active set against an add threshold. Terminal 120x may add the new sector to the active set if the FL pilot measurement exceeds the add threshold. Terminal 120x may also compare FL pilot measurements for a sector that is currently in the active set against a drop threshold and may remove the sector from the active set if the FL pilot measurements fall below the drop threshold for a particular time duration. This time duration may be selected to provide sufficient time hysteresis against fluctuations in FL channel quality. Terminal 120x may send a signaling message with new sectors to be added to the active set and/or weak sectors to be removed from the active set, e.g., to the RL serving sector. The system may assign dedicated control resources and MAC IDs to terminal 120x for the new sectors added to the active set. The system may de-assign dedicated control resources and MAC IDs for the weak sectors removed from the active set. The system may send an active set assignment message to terminal 120x, e.g., from the FL serving sector.

In another design, the system may select sectors to add to or remove from the active set of terminal 120x. Terminal 120x may send the FL pilot measurements to the system. The system may select sectors for the active set based on the FL pilot measurements from terminal 120x and/or RL pilot measurements from the sectors. The system may then send an active set assignment message to terminal 120x.

Each sector in the active set may make RL pilot measurements for the RL pilot transmitted by terminal 120x. An RL pilot measurement may be for received pilot strength, received pilot quality, etc. Received pilot quality may be quantified by a pilot carrier-over-thermal ratio (pCoT), which may be expressed as:

$$pCoT = \frac{\text{average received pilot power per subcarrier}}{\text{average thermal noise per subcarrier}}. \qquad \text{Eq (1)}$$

pCoT does not take into account inter-sector and intra-sector interference at the sector.

Received pilot quality may also be quantified by a pilot carrier-to-interference ratio (C/I), which may be expressed as:

$$\text{Pilot } C/I = \frac{\text{average received pilot power per subcarrier}}{\text{average total noise and interference per subcarrier}}. \qquad \text{Eq (2)}$$

The received pilot quality may also be given by other parameters.

Each sector may map the RL pilot measurements to pilot quality indicators (PQIs). Each sector may generate reports for the PQIs and send the reports on the F-PQICH to terminal 120x at a particular reporting rate, which may be fixed or configurable. The sectors in the active set may send PQIs to terminal 120x at the same or different reporting rates. A sector may skip sending PQI to terminal 120x in a given reporting interval if any one of the following conditions is satisfied:

The RL pilot measurement is weak, e.g., below a low threshold,

The FL channel quality is poor, as indicated by the reports on the R-CQICH, or

The PQI for the current reporting interval is the same as the PQI for the prior reporting interval.

Terminal 120x may receive PQIs from the sectors in the active set. For clarity, the following description assumes that the PQIs are for pCoT. Terminal 120x may maintain a pCoT value for each sector in the active set and may update this pCoT value based on the PQIs received from that sector and other information.

In one design, terminal 120x may derive a pCoT value for a given sector based on a PQI received from that sector, as follows:

$$pCoT = pCoT_{pp} - 10\log_{10}(N_{R\text{-}PICH}), \qquad \text{Eq (3)}$$

where $pCoT_{pp}$ is a post-processing pCoT obtained from the received PQI, $N_{R\text{-}PICH}$ is the number of transmission units used to send the RL pilot, and pCoT is the pCoT value for the sector.

In equation (3), $pCoT_{pp}$ and pCoT are given in units of decibel (dB).

Terminal 120x may transmit the RL pilot in the CDMA segment. In this case, $N_{R\text{-}PICH}$ may be equal to the number of subcarriers times the number of symbol periods for the CDMA segment, and $N_{R\text{-}PICH}$ symbols may be transmitted for the RL pilot. $PCoT_{pp}$ may be equal to the received pilot power combined across all $N_{R\text{-}PICH}$ symbols for the RL pilot and averaged across all antennas at the sector, divided by thermal noise per symbol. $PCoT_{pp}$ is the pCoT for all $N_{R\text{-}PICH}$ symbols whereas pCoT is the pCoT per symbol.

Terminal 120x may monitor the F-PQICH for each sector in the active set and may detect for the PQI in each reporting interval for each sector. A sector may map a PQI to a codeword, process the codeword to generate symbols, and send the symbols on the F-PQICH to terminal 120x. Terminal 120x may perform erasure detection to determine whether a PQI received from a sector is sufficiently reliable. Terminal 120x may compute a metric for the PQI based on the received symbols for the F-PQICH from the sector. Various types of metric may be used for erasure detection. In one design, the metric is a ratio of the Euclidean distance between the received codeword and the nearest valid codeword to the Euclidean distance between the received codeword and the next nearest valid codeword. A smaller metric corresponds to greater confidence in the received codeword being correct, and vice versa. Terminal 120x may compare the metric for the PQI against an erasure threshold, declare a valid PQI if the metric is less than the erasure threshold, and declare an erased PQI otherwise. An erased PQI may result from (1) the sector not sending the PQI due to any of the reasons noted above or (2) the sector sending the PQI but terminal 120x receiving the PQI with weak power due to poor forward link channel conditions.

Terminal 120x may update the pCoT value for each sector based on the PQIs received from that sector. In particular, terminal 120x may update the pCoT value for each sector whenever a valid PQI is obtained for that sector and may maintain the pCoT value whenever an erased PQI is obtained for the sector. In one design, if the number of consecutive erased PQIs from a sector is smaller than a MaxPQICHErasures, then terminal 120x uses the most recent valid PQI to compute the pCoT value for that sector. MaxPQICHErasures may be a fixed or configurable parameter and may be set, e.g., to 4 or some other value. The sectors in the active set may have the same or different values of MaxPQICHErasures.

In one design, terminal 120x may set the pCoT value for a given sector in the active set to a default pCoT value if a valid PQI is not obtained for this sector in MaxPQICHErasures most recent PQIs. A default pCoT value for the RL serving sector may be expressed as:

$$pCoT_{RLSS} = \text{DefaultPQIValueForRLSS} - 10 \log_{10}(N_{R\text{-}PICH}) \qquad \text{Eq (4)}$$

where DefaultPQIValueForRLSS is a fixed or configurable parameter, and $pCoT_{RLSS}$ is a default pCoT value for the RL serving sector.

A default pCoT value for an active set sector s that is not the RL serving sector may be determined based on the pCoT value for the RL serving sector, as follows:

$$pCoT_s = pCoT_{RLSS} - \text{ChanDiff}_s, \qquad \text{Eq (5)}$$

where $\text{ChanDiff}_s$ is a difference in channel gains of sector s and the RL serving sector, and $pCoT_s$ is a default pCoT value for sector s.

$\text{ChanDiff}_s$ for sector s may be expressed as:

$$\text{ChanDiff}_s = 10 \log_{10}\left[\frac{RxPower_{RLSS}}{EffectiveTransmitPower_{RLSS}} \times \frac{EffectiveTransmitPower_s}{RxPower_s}\right], \qquad \text{Eq (6)}$$

where $EffectiveTransmitPower_s$ is the transmit power of sector s, $EffectiveTransmitPower_{RLSS}$ is the transmit power of the RL serving sector, $RxPower_s$ is the received power of sector s at terminal 120x, and $RxPower_{RLSS}$ is the received power of the RL serving sector at terminal 120x.

$EffectiveTransmitPower_{RLSS}$ and $EffectiveTransmitPower_s$ may be broadcast by the RL serving sector and sector s, respectively, or may be obtained from these sectors in other manners. $RxPower_{RLSS}$ and $RxPower_s$ may be measured by terminal 120x based on the FL pilots transmitted by the RL serving sector and sector s, respectively. $\text{ChanDiff}_s$ is indicative of the difference in channel gains between sector s and the RL serving sector. Equation (5) uses the estimated channel gains for the forward link to estimate the pCoT value for sector s for the reverse link.

The default pCoT values for the sectors in the active set may also be determined based on other parameters such as, e.g., a target pCoT for the RL pilot transmitted by terminal 120x. The default pCoT values are open-loop values that may be used when closed-loop values from the PQIs are not available. A default pCoT value may also be used for a sector if strong FL pilot measurements but weak pCoT values are obtained for the sector for a predetermined duration. The weak pCoT values may result from RL pilot measurement errors, which may be due to bad timing at the sector.

At any given moment, terminal 120x may have a pCoT value for each sector in the active set. This pCoT value may be determined based on the most recent valid PQI received from the sector as shown in equation (3) or may be set to a default pCoT value as shown in equation (4) or (5). Terminal 120x may select desired serving sectors for the forward and reverse links based on the pCoT values for the sectors in the active set. Terminal 120x may be served by one sector in the active set on the forward link and may be served by the same sector or another sector in the active set on the reverse link. Different sectors may serve terminal 120x on the forward and reverse links to improve performance in situations where the best serving sectors for the two links are different. For each link, terminal 120x may perform handoff if the desired serving sector for that link is not the current serving sector for the link.

In one design, handoff for a given link may be performed based on the following steps:

Selection—terminal 120x selects a desired serving sector for the link based on one or more constraints and/or one or more conditions;

Indication—terminal 120x requests handoff to the desired serving sector,

Signaling & detection—the desired serving sector receives the handoff request, and Completion—the desired serving sector sends a message to complete the handoff.

The handoff steps are described in detail below.

Table 2 shows various types of information that may be used to select serving sectors for terminal 120x on the forward and reverse links. Terminal 120x may obtain a pCoT value for each sector as described above. Terminal 120x may obtain FL pilot measurements for each sector based on the FL pilot transmitted by that sector. Terminal 120x may obtain interference information from each sector via broadcast and/or unicast messages. The interference information may comprise a rise over thermal ratio (RoT), an interference over thermal ratio (IoT), etc. RoT is the ratio of the total received power at a sector to thermal noise and is indicative of the capacity and stability of the CDMA segment. IoT is the ratio of inter-sector interference plus thermal noise to thermal noise and is applicable for OFDMA channels.

TABLE 2

| Sector A (RLSS) | Sector B (FLSS) | Sector C |
| --- | --- | --- |
| $pCoT_{RLSS}$ | $pCoT_{FLSS}$ | $pCoT_C$ |
| FL pilot measurement A | FL pilot measurement B | FL pilot measurement C |
| RoT of sector A | RoT of sector B | RoT of sector C |
| IoT of sector A | IoT of sector B | IoT of sector C |

For forward link handoff, terminal 120x may select a desired FL serving sector (DFLSS) based on the following constraint:

$$pCoT_{Max} - pCoT_{DFLSS} < \text{MaxRLPilotDifferenceForDFLSS}, \qquad \text{Eq (7)}$$

where

MaxRLPilotDifferenceForDFLSS is a fixed or configurable parameter, $pCoT_{DFLSS}$ is the pCoT value for the desired FL serving sector, and $pCoT_{Max}$ is the largest pCoT value among all sectors in the active set.

For the constraint in equation (7), terminal 120x may select any sector in the active set as the desired FL serving sector if the pCoT value for the selected sector is within MaxRLPilotDifferenceForDFLSS of the largest pCoT value. This constraint may ensure that terminal 120x does not select a sector whose RL channel quality is too poor (relative to the best RL sector) as the desired FL serving sector. This may reduce interference at other sectors.

Terminal 120x may be required to select a new FL serving sector if the following condition is satisfied:

$$pCoT_{Max} - pCoT_{FLSS} > \text{MaxRLPilotDifferenceForFLSS}, \quad \text{Eq (8)}$$

where MaxRLPilotDifferenceForFLSS is a fixed or configurable parameter, and $pCoT_{FLSS}$ is the pCoT value for the current FL serving sector.

Equation (8) may require terminal 120x to select a new FL serving sector if the pCoT value for the current FL serving sector is MaxRLPilotDifferenceForFLSS or more worse than the largest pCoT value. MaxRLPilotDifferenceForFLSS in equation (8) may or may not be equal to MaxRLPilotDifferenceForDFLSS in equation (7).

Terminal 120x may select any sector in the active set (e.g., the sector with the best FL pilot measurement) as the desired FL serving sector, subject to the constraint in equation (7). Terminal 120x may not select the sector with the best FL pilot measurement, e.g., if this sector has a large IoT value and terminal 120x suspects that it will not be able to successfully transmit the R-ACKCH to that sector. Terminal 120x may use strength hysteresis and select a new FL serving sector only if the FL pilot measurement for this sector exceeds the FL pilot measurement for the current FL serving sector by a predetermined amount. Strength hysteresis may be used to avoid continually switching between different sectors due to FL pilot measurement errors. Alternatively or additionally, terminal 120x may use time hysteresis and select a new FL serving sector only if the FL pilot measurements for this sector exceed the FL pilot measurements for the current FL serving sector over a predetermined time duration. Time hysteresis may be used to avoid performing handoff too often. The predetermined duration may be sufficiently short to allow for fast handoff in order to avoid dropping calls at coverage edges.

For reverse link handoff, terminal 120x may select a desired RL serving sector (DRLSS) based on the following constraint:

$$pCoT_{Max} - pCoT_{DRLSS} < \text{MaxRLPilotDifferenceForDRLSS}, \quad \text{Eq (9)}$$

where MaxRLPilotDifferenceForDRLSS is a fixed or configurable parameter, and $pCoT_{DRLSS}$ is the pCoT value for the desired RL serving sector.

For the constraint in equation (9), terminal 120x may select any sector in the active set as the desired RL serving sector if the pCoT value for the selected sector is within MaxRLPilotDifferenceForDRLSS of the largest pCoT value. This constraint may ensure that terminal 120x does not select a sector whose RL channel quality is too poor (relative to the best RL sector) as the desired RL serving sector.

Terminal 120x may select the desired RL serving sector based on the following additional constraints:

1. The RoT of the desired RLSS should not impose link budget limitation for terminal 120x for signaling sent in the CDMA segment,
2. The IoT of the desired RLSS should not impose link budget limitation for terminal 120x for OFDMA control channel, e.g., the R-ACKCH channel, and
3. The IoT of the desired RLSS should not impose link budget limitation for terminal 120x for OFDMA data channel for a desired quality of service (QoS).

Constraint 1 may ensure that terminal 120x can achieve a target C/I for signaling sent in the CDMA segment to the desired RL serving sector based on the maximum transmit power available at terminal 120x. Constraint 2 may ensure that terminal 120x can achieve a target C/I for signaling sent on the OFDMA control channel. Constraint 3 may ensure that terminal 120x can achieve a suitable data rate for the desired QoS for traffic data sent on the OFDMA data channel. In general, the selection of the desired RL serving sector may be based on any set of constraint(s).

Terminal 120x may be required to select a new RL serving sector if the following condition is satisfied:

$$pCoT_{Max} - pCoT_{RLSS} > \text{MaxRLPilotDifferenceForRLSS}, \quad \text{Eq (10)}$$

where MaxRLPilotDifferenceForRLSS is a fixed or configurable parameter, and $pCoT_{RLSS}$ is the pCoT value for the current RL serving sector.

Equation (10) may require terminal 120x to select a new RL serving sector if the pCoT value for the current RL serving sector is MaxRLPilotDifferenceForRLSS or more worse than the largest pCoT value. MaxRLPilotDifferenceForRLSS in equation (10) may or may not be equal to MaxRLPilotDifferenceForDRLSS in equation (9).

Terminal 120x may select any sector in the active set (e.g., the sector with the best pCoT value) as the desired RL serving sector, subject to the constraints described above. Terminal 120x may not select the sector with the best pCoT value, e.g., if this sector has a weak forward link and terminal 120x suspects that it will not be able to receive forward link signaling from that sector. Terminal 120x may use strength hysteresis and/or time hysteresis in selecting the desired RL serving sector, as described above for the selection of the desired FL serving sector.

Figure 5:
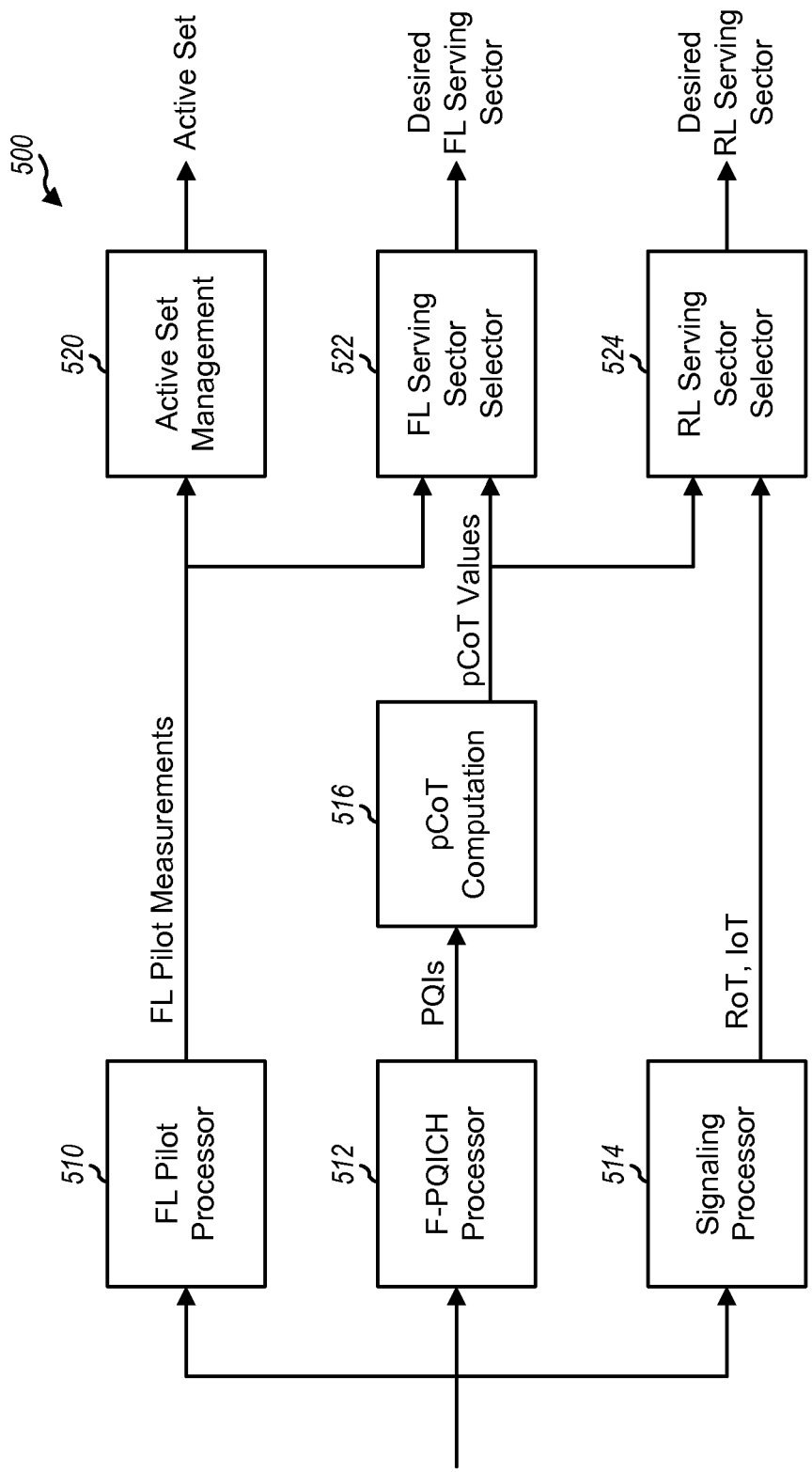
FIG. 5 shows a block diagram of a serving sector selector.

FIG. 5 shows a block diagram of a design of a serving sector selector 500, which may reside at terminal 120x. Within selector 500, an FL pilot processor 510 may make measurements for FL pilots received from different sectors. Processor 510 may provide FL pilot measurements for all sectors to an active set management unit 520 and may provide FL pilot measurements for the sectors in the active set to an FL serving sector selector 522. An F-PQICH processor 512 may process a received signal at terminal 120x to recover PQIs sent by the sectors in the active set to terminal 120x. A computation unit 516 may compute a pCoT value for each sector in the active set based on the PQIs received from that sector and other information, as described above. A signaling processor 514 may process the received signal to recover RoT and IoT reports sent by the sectors in the active set.

Unit 520 may receive FL pilot measurements for different sectors and may determine new sectors to add to the active set and/or weak sectors to remove from the active set. FL serving sector selector 522 may receive the FL pilot measurements and the pCoT values for the sectors in the active set and may select the desired FL serving sector. RL serving sector selector 524 may receive the pCoT values and the RoT and IoT for the sectors in the active set and may select the desired RL serving sector.

In one design, terminal 120x may request a forward link handoff by targeting the R-CQICH to the desired FL serving sector. This R-CQICH targeting may be achieved by setting a DFLSS bit in a CQI report sent to the desired FL serving sector. Terminal 120x may send CQI reports to one or more sectors in the active set but may set the DFLSS bit for only the desired FL serving sector. Each sector in the active set may receive CQI reports sent by terminals 120x to that sector. A sector may recognize that it is the desired FL serving sector if the DFLSS bit is set in the CQI report sent to that sector. Upon successfully decoding the CQI report with the DFLSS bit set, the desired FL serving sector may send messages via the backhaul to the current FL serving sector to indicate the forward link handoff and to request transfer of state information and traffic data for terminal 120x for the forward link. Upon receiving the state information and traffic data for terminal 120x, the desired FL serving sector may send a message to terminal 120x to indicate completion of the forward link handoff.

In one design, terminal 120x may request a reverse link handoff by targeting the R-REQCH to the desired RL serving sector. Terminal 120x may normally send requests for radio resources on the R-REQCH to the current RL serving sector. The R-REQCH targeting may be achieved by sending a request for radio resources on the R-REQCH to the desired RL serving sector, instead of the current RL serving sector. Each sector in the active set may monitor the R-REQCH for possible resource requests sent by terminals 120x to that sector. A sector may recognize that it is the desired RL serving sector if a resource request is sent on the R-REQCH to that sector and the sector is not the current RL serving sector. Upon successfully decoding the resource request, the desired RL serving sector may send messages via the backhaul to the current RL serving sector to indicate the reverse link handoff. The desired RL serving sector may then send a message to terminal 120x to indicate completion of the reverse link handoff.

In another design, terminal 120x may send an access probe on the R-ACH to a desired serving sector to request handoff. The access probe may carry a request for handoff on the forward link and/or the reverse link. Terminal 120x may send an access probe with a forward link handoff request to the desired FL serving sector. Terminal 120x may send an access probe with a reverse link handoff request or a handoff request for both the forward and reverse links to the desired RL serving sector. In any case, the desired serving sector may receive an access probe with a handoff request from terminal 120x and may exchange messages with the current serving sector for the handoff. The desired serving sector may then return an access grant to terminal 120x to indicate completion of the handoff request.

Terminal 120x may use the first handoff request mechanism (which covers R-CQICH targeting for forward link handoff and R-REQCH targeting for reverse link handoff) for normal handoff scenarios. In one design, terminal 120x may use the second handoff request mechanism (which covers sending access probes) if any one of the following occurs:

1. The desired serving sector and the current serving sector are asynchronous,
2. The first mechanism is unlikely to be successful, e.g., because of timing misalignment at the sectors, or
3. The first mechanism was used but was not successful.

Figure 6:
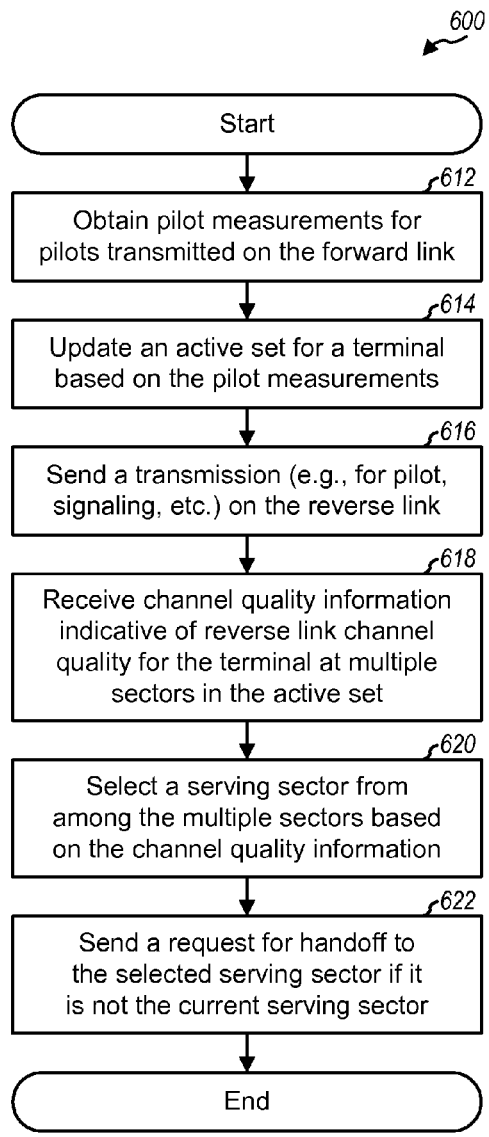
FIG. 6 shows a process for performing handoff by a terminal.

FIG. 6 shows a design of a process 600 for performing handoff by a terminal. Pilot measurements may be obtained for pilots transmitted on the forward link (block 612). An active set for the terminal may be updated based on the pilot measurements (block 614). For example, sectors may be added to and/or removed from the active set based on the pilot measurements. In general, the active set may be maintained by the terminal or the system.

A transmission may be sent on the reverse link (block 616). Channel quality information indicative of reverse link channel quality for the terminal at multiple sectors in the active set may be received (block 618). The channel quality information may be determined by the multiple sectors based on the transmission sent by the terminal on the reverse link. The transmission may comprise pilot, and the channel quality information from each sector may comprise pCoT, PC commands, etc., determined by the sector based on the pilot. The transmission may comprise signaling messages sent to a sector, and the channel quality information may comprise erasure indicators determined by the sector based on the signaling messages.

A serving sector may be selected from among the multiple sectors based on the channel quality information (block 620). For block 620, a channel quality value (e.g., a pCoT value) may be determined for each sector based on the channel quality information and may be indicative of the reverse link channel quality for the terminal at the sector. For each sector, a report containing channel quality information may be received from the sector and may be processed to determine whether the report is decoded correctly or erased. The channel quality value for the sector may be retained if the report is erased and may be updated based on a value determined from the report if it is decoded correctly. The channel quality value may be set to a default value if a correctly decoded report is not obtained for the sector within a predetermined number of update intervals. The default value for a reverse link serving sector may be determined based on a fixed or configurable parameter, e.g., as shown in equation (4). The default value for a sector that is not the reverse link serving sector may be determined based on the channel quality value for the reverse link serving sector and a channel difference between that sector and the reverse link serving sector, e.g., as shown in equation (5). The serving sector may be selected based on the channel quality values for the multiple sectors.

For the forward link, a forward link serving sector may be selected based on pilot measurements obtained for pilots transmitted by the multiple sectors in the active set and the channel quality information. For the reverse link, a reverse link serving sector may be selected based on the reverse link channel quality for the terminal at the multiple sectors. For each link, the selected serving sector may have reverse link channel quality that is within a predetermined amount of the best reverse link channel quality among the multiple sectors, e.g., as shown in equations (7) and (9). For each link, a new serving sector may be selected if the current serving sector has reverse link channel quality that is more than a predetermined amount worse than the best reverse link channel quality among the multiple sectors, e.g., as shown in equations (8) and (10). Interference information (e.g., RoT, IoT, etc.) indicative of interference at the multiple sectors may also be obtained by the terminal. The serving sector may be selected further based on the interference information, e.g., as described above.

A request for handoff may be sent to the selected serving sector if it is not the current serving sector (block 622). The request may be sent using signaling messages, access probes, etc. An indication of completion of the handoff may be received from the selected serving sector.

Figure 7:
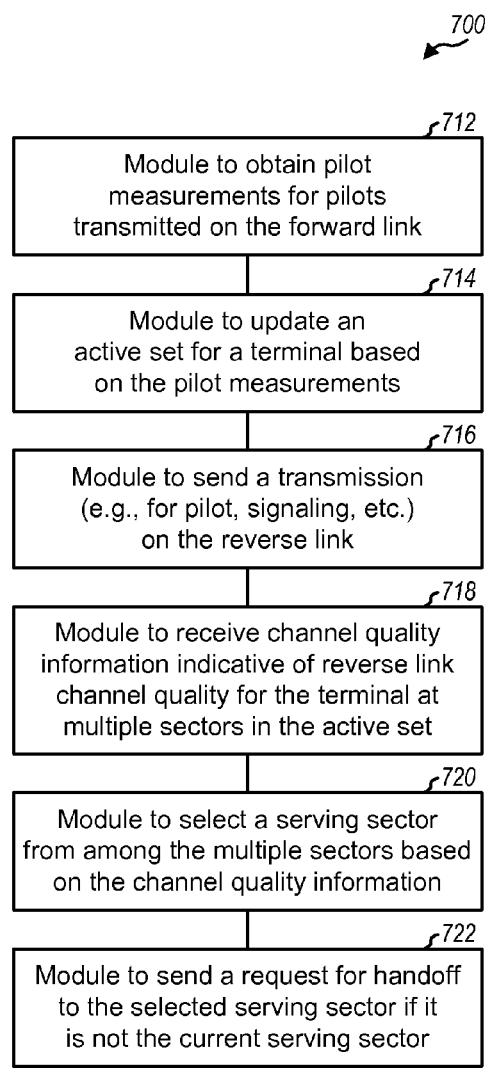
FIG. 7 shows an apparatus for performing handoff by a terminal.

FIG. 7 shows a design of an apparatus 700 for performing handoff. Apparatus 700 includes means for obtaining pilot measurements for pilots transmitted on the forward link (module 712), means for updating an active set for a terminal based on the pilot measurements (module 714), means for sending a transmission (e.g., for pilot, signaling, etc.) on the reverse link (module 716), means for receiving channel quality information indicative of reverse link channel quality for the terminal at multiple sectors in the active set (module 718), means for selecting a serving sector from among the multiple sectors based on the channel quality information (module 720), and means for sending a request for handoff to the selected serving sector if it is not the current serving sector (module 722).

FIG. 8 shows a design of a process 800 for sending a request for handoff. Process 800 may be performed by a terminal for step 622 in FIG. 6. A request for handoff to a desired serving sector may be sent using a first mechanism (block 812). For the first mechanism, the request for handoff may be sent to the desired serving sector by (1) setting a designated bit in a message (e.g., for CQI) sent to the desired serving sector or (2) sending a resource request to the desired serving sector instead of the current serving sector. The request for handoff may be sent using a second mechanism if the first mechanism is unsuccessful (block 814). For the second mechanism, the request for handoff may be sent to the desired serving sector by sending an access probe for handoff to this sector. The access probe for handoff may identify the desired serving sector as only the desired forward link serving sector, or only the desired reverse link serving sector, or both the desired forward link serving sector and the desired reverse link serving sector. The access probe may also carry other information related to the handoff.

FIG. 9 shows a design of an apparatus 900 for sending a request for handoff. Apparatus 900 includes means for sending a request for handoff to a desired serving sector using a first mechanism (module 912), and means for sending the request for handoff using a second mechanism if the first mechanism is unsuccessful (module 914).

FIG. 10 shows a design of a process 1000 for supporting handoff by a sector. A transmission (e.g., for pilot, signaling, etc.) may be received from a terminal at a first sector (block 1012). Reverse link channel quality for the terminal at the first sector may be determined based on the received transmission (block 1014). For example, pilot may be received from the terminal, and pCoT may be determined based on the received pilot. Channel quality information indicative of the reverse link channel quality for the terminal at the first sector may be sent to the terminal (block 1016). A request for handoff of the terminal from a second sector to the first sector may be received (block 1018). The first sector may be selected as a new serving sector for the terminal (e.g., for forward and/or reverse link) based on the channel quality information. Interference at the first sector may also be estimated, and interference information indicative of the estimated interference at the first sector may be sent via broadcast and/or unicast messages. The first sector may be selected further based on the interference information.

FIG. 11 shows a design of an apparatus 1100 for supporting handoff by a sector. Apparatus 1100 includes means for receiving a transmission from a terminal at a first sector (module 1112), means for determining reverse link channel quality for the terminal at the first sector based on the received transmission (module 1114), means for sending channel quality information indicative of the reverse link channel quality for the terminal at the first sector (module 1116), and means for receiving a request for handoff of the terminal from a second sector to the first sector, with the first sector being selected as a new serving sector for the terminal based on the channel quality information (module 1118).

The modules in FIGS. 7, 9, and 11 may comprise processors, electronics devices, hardware devices, electronics components, logical circuits, memories, etc., or any combination thereof.

Figure 12:
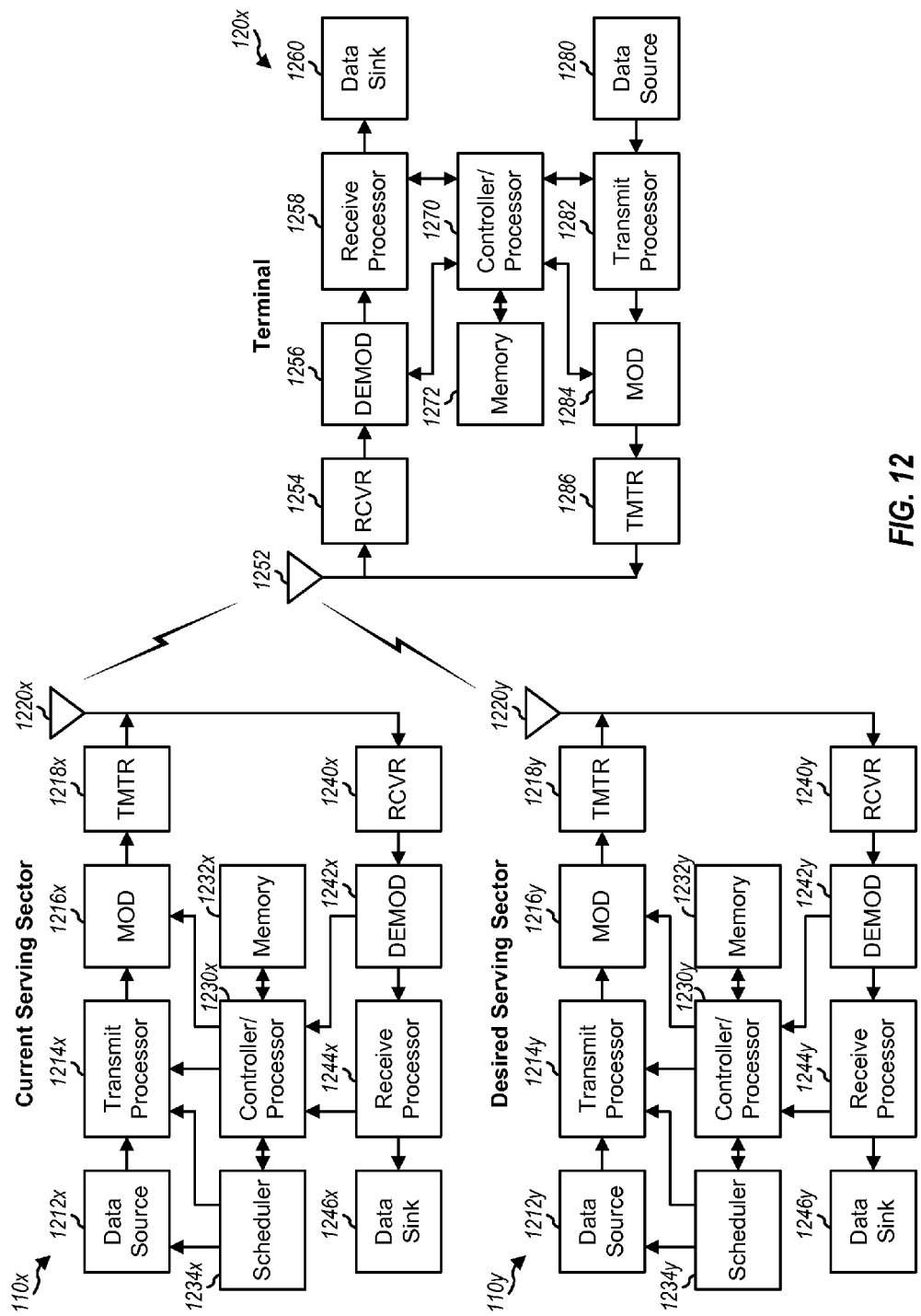
FIG. 12 shows a block diagram of a terminal and two sectors/base stations.

FIG. 12 shows a block diagram of a design of terminal 120x, a current serving sector/base station 110x, and a desired serving sector/base station 110y. At sector 110x, a transmit processor 1214x may receive traffic data from a data source 1212x and signaling from a controller/processor 1230x and a scheduler 1234x. For example, controller/processor 1230x may provide PQIs and other information for terminal 120x and RoT and IoT for sector 110x. Scheduler 1234x may provide an assignment of radio resources for terminal 120x. Transmit processor 1214x may process (e.g., encode, interleave, and symbol map) the traffic data, signaling, and pilot and provide data symbols, signaling symbols, and pilot symbols, respectively. A modulator (MOD) 1216x may perform OFDM modulation on the data, signaling, and pilot symbols and provide output chips. A transmitter (TMTR) 1218x may conditions (e.g., convert to analog, amplify, filter, and upconvert) the output chips and generate a forward link signal, which may be transmitted via an antenna 1220x.

Sector 110y may similarly process traffic data and signaling for the terminals served by sector 110y. The traffic data, signaling, and pilot may be processed by a transmit processor 1214y, modulated by a modulator 1216y, conditioned by a transmitter 1218y, and transmitted via an antenna 1220y.

At terminal 120x, an antenna 1252 may receive the forward link signals from sectors 110x and 110y and possibly other sectors. A receiver (RCVR) 1254 may condition (e.g., filter, amplify, downconvert, and digitize) a received signal from antenna 1252 and provide samples. A demodulator (DE-MOD) 1256 may perform OFDM demodulation on the samples and provide symbol estimates. A receive processor 1258 may process (e.g., symbol demap, deinterleave, and decode) the symbol estimates, provide decoded data to a data sink 1260, and provide decoded signaling (e.g., PQIs, RoT, IoT, etc.) to a controller/processor 1270.

On the reverse link, a transmit processor 1282 may receive and process traffic data from a data source 1280 and signaling (e.g., handoff requests, resource requests, CQIs, etc.) from controller/processor 1270. A modulator 1284 may perform OFDM modulation for OFDMA channels and CDMA modulation for pilot and CDMA channels and may provide output chips for all channels. A transmitter 1286 may condition the output chips and generate a reverse link signal, which may be transmitted via antenna 1252.

At each sector, the reverse link signals from terminal 120x and other terminals may be received by antenna 1220, conditioned by a receiver 1240, demodulated by a demodulator 1242, and processed by a receive processor 1244. Processor 1244 may provide decoded data to a data sink 1246 and decoded signaling to controller/processor 1230. Demodulator 1242 may estimate the reverse link channel quality for terminal 120x and may provide this information to controller/processor 1230. Controller/processor 1230 may generate PQIs and/or other channel quality information for terminal 120x.

Controllers/processors 1230x, 1230y and 1270 may direct the operation at sectors 119x and 110y and terminal 120x, respectively. Memories 1232a, 1232y and 1272 may store data and program codes for sectors 110x and 110y and terminal 120x, respectively. Schedulers 1234x and 1234y may schedule terminals communicating with sectors 110x and 110y, respectively, and may assign channels and/or radio resources to the terminals.

The processors in FIG. 12 may perform various functions for the techniques described herein. For example, the processors at terminal 120x may implement process 600 in FIG. 6, process 800 in FIG. 8, and/or other processes for the techniques described herein. The processor at each sector 110 may implement process 1000 in FIG. 10 and/or other processes for the techniques described herein. Processor 1258 and/or 1270 at terminal 120x may also implement some or all of units 510 through 524 in FIG. 5.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 1232x, 1232y, or 1272 in FIG. 12) and executed by a processor (e.g., processor 1230x, 1230y, or 1270). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
    at least one processor configured to:
        receive channel quality information indicative of a reverse link channel quality for a terminal at multiple sectors, wherein the channel quality information includes a pilot carrier-over-thermal ratio determined selectively based upon a transmitted pilot and a predetermined value,
        determine a channel quality value for each of the multiple sectors to indicate the reverse link channel quality for the terminal based on the channel quality information,
        select a serving sector from among the multiple sectors based on channel quality values for the multiple sectors,
        determine a default value of the channel quality value for a sector among the multiple sectors based on a configurable parameter, and
        set the channel quality value for the sector to the default if a correctly decoded report including the channel quality information is not obtained from the sector within a predetermined number of update intervals; and
    a memory coupled to the at least one processor.

2. The apparatus of claim 1, wherein the at least one processor is configured to receive the report with the channel quality information from the sector among the multiple sectors, to determine whether the report is decoded correctly or erased, to retain the channel quality value for the sector if the report is erased, and to update the channel quality value for the sector based on a value determined from the report if decoded correctly.

3. An apparatus for wireless communication, comprising:
    at least one processor configured to:
        receive channel quality information indicative of a reverse link channel quality for a terminal at multiple sectors, wherein the channel quality information includes a pilot carrier-over-thermal ratio determined selectively based upon a transmitted pilot and a predetermined value,
        determine a channel quality value for each of the multiple sectors to indicate the reverse link channel quality for the terminal based on the channel quality information,
        select a serving sector from among the multiple sectors based on channel quality values for the multiple sectors,
        determined a default value for a sector among the multiple sectors based on a channel quality value for a reverse link serving sector and a channel difference between the sector and the reverse link serving sector, and
        set the channel quality value for the sector to the default value if a correctly decoded report including the channel quality information is not obtained from the sector within a predetermined number of update intervals; and
    a memory coupled to the at least one processor.

4. The apparatus of claim 1, wherein the at least one processor is configured to obtain pilot measurements for pilots received from the multiple sectors, and to select the serving sector for a forward link based on the pilot measurements and the channel quality information.

5. The apparatus of claim 1, wherein the at least one processor is configured to determine the reverse link channel quality for the terminal at each of the multiple sectors based on the channel quality information, and to select the serving sector for a reverse link based on the reverse link channel quality for the terminal at each of the multiple sectors.

6. The apparatus of claim 1, wherein the at least one processor is configured to determine the reverse link channel quality for the terminal at each of the multiple sectors based on the channel quality information, and to select the serving sector having a reverse link channel quality that is within a predetermined amount of a best reverse link channel quality among the multiple sectors.

7. The apparatus of claim 1, wherein the at least one processor is configured to determine the reverse link channel quality for the terminal at each of the multiple sectors based on the channel quality information, and to select a new serving sector if a current serving sector has a reverse link channel quality that is more than a predetermined amount worse than a best reverse link channel quality among the multiple sectors.

8. The apparatus of claim 1, wherein the at least one processor is configured to obtain interference information indicative of interference at the multiple sectors, and to select the serving sector based on the channel quality information and the interference information.

9. The apparatus of claim 8, wherein the interference information comprises at least one of a rise over thermal ratio (RoT) and an interference over thermal ratio (IoT).

10. The apparatus of claim 1, wherein the at least one processor is configured to obtain pilot measurements for pilots transmitted on a forward link and to update an active set for the terminal based on the pilot measurements, the active set including the multiple sectors.

11. The apparatus of claim 1, wherein the at least one processor is configured to send pilot on the reverse link and to receive from each of the multiple sectors the channel quality information comprising the pilot carrier-over-thermal ratio (pCoT) determined by the sector based on the pilot sent on the reverse link.

12. The apparatus of claim 1, wherein the at least one processor is configured to send signaling messages on the reverse link to the sector among the multiple sectors, and to receive the channel quality information comprising erasure indicators determined by the sector based on the signaling messages sent to the sector.

13. The apparatus of claim 1, wherein the at least one processor is configured to send a pilot on the reverse link and to receive the channel quality information comprising power control (PC) commands determined by the sector based on the pilot sent on the reverse link.

14. The apparatus of claim 1, wherein the at least one processor is configured to send a request for handoff to the selected serving sector which is not a current serving sector.

15. The apparatus of claim 14, wherein the at least one processor is configured to send the request for handoff via an access probe on an access channel to the selected serving sector.

16. A method, comprising:
receiving channel quality information indicative of a reverse link channel quality for a terminal at multiple sectors, wherein the channel quality information includes a pilot carrier-over-thermal ratio determined selectively based upon a transmitted pilot and a predetermined value;
determining a channel quality value for each of the multiple sectors to indicate the reverse link channel quality for the terminal based on the channel quality information;
selecting a serving sector from among the multiple sectors based on channel quality values for the multiple sectors;
determining a default value of the channel quality value for a sector among the multiple sectors based on a configurable parameter; and
setting the channel quality value for the sector to the default value if a correctly decoded report including the channel quality information is not obtained from the sector within a predetermined number of update intervals.

17. The method of claim 16, further comprising:
sending a pilot on a reverse link, wherein the receiving channel quality information comprises receiving from each of the multiple sectors the channel quality information comprising the pilot carrier-over-thermal ratio (pCoT) determined by the sector based on the pilot sent on the reverse link.

18. The method of claim 16, wherein the selecting the serving sector comprises:
obtaining pilot measurements for pilots received from the multiple sectors; and
selecting the serving sector for a forward link based on the pilot measurements and the channel quality information.

19. The method of claim 16, wherein the selecting the serving sector comprises:
determining the reverse link channel quality for the terminal at each of the multiple sectors based on the channel quality information; and
selecting the serving sector for reverse link based on the reverse link channel quality for the terminal at each of the multiple sectors.

20. The method of claim 16, wherein the selecting the serving sector comprises:
determining the reverse link channel quality for the terminal at each of the multiple sectors based on the channel quality information; and selecting a new serving sector if a current serving sector has a reverse link channel quality that is more than a predetermined amount worse than a best reverse link channel quality among the multiple sectors.

21. An apparatus, comprising:
means for receiving channel quality information indicative of a reverse link channel quality for a terminal at multiple sectors, wherein the channel quality information includes a pilot carrier-over-thermal ratio determined selectively based upon a transmitted pilot and a predetermined value;
means for determining a channel quality value for each of the multiple sectors to indicate the reverse link channel quality for the terminal based on the channel quality information;
means for selecting a serving sector from among the multiple sectors based on channel quality values for the multiple sectors;
means for determining a default value of the channel quality value for a sector among the multiple sectors based on a configurable parameter; and
means for setting the channel quality value for the sector to the default value if a correctly decoded report including the channel quality information is not obtained from the sector within a predetermined number of update intervals.

22. The apparatus of claim 21, further comprising:
means for sending a pilot on a reverse link, wherein the means for receiving channel quality information comprises means for receiving from each of the multiple sectors the channel quality information comprising the pilot carrier-over-thermal ratio (pCoT) determined by the sector based on the pilot sent on the reverse link.

23. The apparatus of claim 21, wherein the means for selecting the serving sector comprises:
means for obtaining pilot measurements for pilots received from the multiple sectors; and
means for selecting the serving sector for a forward link based on the pilot measurements and the channel quality information.

24. The apparatus of claim 21, wherein the means for selecting the serving sector comprises:
means for determining the reverse link channel quality for the terminal at each of the multiple sectors based on the channel quality information; and
means for selecting the serving sector for reverse link based on the reverse link channel quality for the terminal at each of the multiple sectors.

25. The apparatus of claim 21, wherein the means for selecting the serving sector comprises:
means for determining the reverse link channel quality for the terminal at each of the multiple sectors based on the channel quality information; and
means for selecting a new serving sector if a current serving sector has a reverse link channel quality that is more than a predetermined amount worse than a best reverse link channel quality among the multiple sectors.

26. A non-transitory processor-readable medium including instructions stored thereon, comprising:
a first instruction set for receiving channel quality information indicative of a reverse link channel quality for a terminal at multiple sectors, wherein the channel quality information includes a pilot carrier-over-thermal ratio determined selectively based upon a transmitted pilot and a predetermined value;
a second instruction set for determining a channel quality value for each of the multiple sectors to indicate the reverse link channel quality or the terminal based on the channel quality information;

a third instruction set for selecting a serving sector from among the multiple sectors based on channel quality values for the multiple sectors;

a fourth instruction set for determining a default value of the channel quality value for a sector among the multiple sectors based on a configurable parameter; and a fifth instruction set for setting the channel quality value for the sector to the default value if a correctly decoded report including the channel quality information is not obtained from the sector within a predetermined number of update intervals.

27. The non-transitory processor-readable medium of claim 26, wherein selecting the serving sector comprises:

obtaining pilot measurements for pilots received from the multiple sectors; and selecting the serving sector for a forward link based on the pilot measurements and the channel quality information.

28. The non-transitory processor-readable medium of claim 26, wherein selecting the serving sector comprises:

determining the reverse link channel quality for the terminal at each of the multiple sectors based on the channel quality information; and selecting the serving sector for a reverse link based on the reverse link channel quality for the terminal at each of the multiple sectors.

* * * * *